US011716590B2

(12) United States Patent
Sankaran

(10) Patent No.: US 11,716,590 B2
(45) Date of Patent: Aug. 1, 2023

(54) CONTACT TRACING BASED ON ASSOCIATIONS IN A WIRELESS NETWORK

(71) Applicant: ARRIS Enterprises LLC, Suwanee, GA (US)

(72) Inventor: Sundar Sankaran, Saratoga, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 30 days.

(21) Appl. No.: 17/324,158

(22) Filed: May 19, 2021

(65) Prior Publication Data

US 2021/0368291 A1 Nov. 25, 2021

Related U.S. Application Data

(60) Provisional application No. 63/028,563, filed on May 22, 2020.

(51) Int. Cl.
*H04W 4/029* (2018.01)
*H04W 4/02* (2018.01)
*G08B 21/18* (2006.01)

(52) U.S. Cl.
CPC .......... *H04W 4/023* (2013.01); *G08B 21/18* (2013.01); *H04W 4/029* (2018.02)

(58) Field of Classification Search
CPC ................................ H04W 4/02; H04W 4/023
See application file for complete search history.

(56) References Cited

U.S. PATENT DOCUMENTS

| 6,091,956 A * | 7/2000 | Hollenberg | G06Q 30/02 |
| | | | 455/566 |
| 10,075,530 B2 * | 9/2018 | Park | H04W 4/80 |
| 11,397,711 B1 * | 7/2022 | Krishnamurthy | H04L 67/56 |

(Continued)

OTHER PUBLICATIONS

"Comparing Google Community Mobility Report with Linkyfi's WiFi-based data," at https://www.avsystem.com/blog/how-linkyfi-provides-accurate-reporting-during-covid-19/, May 5, 2020.
(Continued)

*Primary Examiner* — Qutbuddin Ghulamali
(74) *Attorney, Agent, or Firm* — Steven Stupp; Stewart Wiener

(57) ABSTRACT

A computer may receive connection information associated with one or more communication devices in a network, where the connection information specifies dynamic associations or connections between electronic devices and the one or more communication devices in an environment as a function of time. Then, the computer may store system information that includes: first identifiers of the one or more communication devices, second identifiers of the electronic devices, and timestamps, where a portion of the system information specifies a duration of a dynamic association or connection between a given electronic device and a given communication device. Moreover, the computer may receive occurrence information that indicates an occurrence of an event. In response, the computer may determine, based at least in part on the system information, one or more regions in the environment where an electronic device was present during a time interval, and the computer may accordingly perform a remedial action.

20 Claims, 5 Drawing Sheets

(56) References Cited

U.S. PATENT DOCUMENTS

| | | | | |
|---|---|---|---|---|
| 2014/0337052 | A1* | 11/2014 | Pellini | G16H 10/20 |
| | | | | 705/3 |
| 2015/0003357 | A1* | 1/2015 | Schreiber | H04N 21/2146 |
| | | | | 370/329 |
| 2015/0106427 | A1* | 4/2015 | Tang | H04W 4/029 |
| | | | | 709/203 |
| 2015/0134743 | A1* | 5/2015 | Heo | H04W 4/80 |
| | | | | 709/204 |
| 2017/0061759 | A1* | 3/2017 | Guo | H04L 67/54 |
| 2020/0099499 | A1* | 3/2020 | Yeo | H04W 56/001 |

OTHER PUBLICATIONS

"Mist Systems Provides Strategic Solutions to Support Contact Tracing for the AI-Driven Enterprise," Juniper Networks Press Release, May 21, 2020.

"Skyfii's OccupancyNow Toolkit," downloaded from https://apps.meraki.io/details/skyfii-s-occupancynow-toolkit/ at https://archive.org, Aug. 4, 2020.

* cited by examiner

CONTACT TRACING BASED ON ASSOCIATIONS IN A WIRELESS NETWORK

CROSS REFERENCE TO RELATED APPLICATIONS

This application claims priority under 35 U.S.C. 119(e) to: U.S. Provisional Application Ser. No. 63/028,563, "Contact Tracing Based on Associations in a Wireless Network," filed on May 22, 2020, by Sundar Sankaran, the contents of which are herein incorporated by reference.

FIELD

The described embodiments relate to techniques for determining spatial and temporal overlap of electronic devices. Notably, the described embodiments relate to techniques for determining spatial and temporal overlap of electronic devices associated with users based at least in part on associations of the electronic devices in a wireless network.

BACKGROUND

A variety of public health initiatives are often used to help address an outbreak of an infectious disease. For example, public health surveillance may be used, on an ongoing basis, to collect, analyze and interpret data in an attempt to identify affected or symptomatic individuals. This data may be disseminated to, e.g., public health departments, which then use the information to try to prevent and control further spreading of disease and/or injury.

For example, when an individual is diagnosed with an infectious disease, local public health officials may attempt to identify all the other individuals who came in contact with this individual while they we infectious (which is sometimes referred to as 'contact tracing'). Then, the identified other individuals can be treated or isolated, thereby eliminating the subsequent spread of the infectious disease from any of the other individuals that were infected. In principle, when implemented effectively and systematically, contact tracing can protect the remainder of the population from the infectious disease.

However, contact tracing is often performed via in-person interviews with infected individuals and the other individuals they came in contact with. Consequently, in practice it is usually difficult to scale contact tracing. This can limit the effectiveness of contact tracing for an infectious disease that is easily transmitted (such as an infectious disease with a large basic reproduction number or Ro value) or when an infectious disease has already infected a large number of people (and, therefore, transitioned to significant community spreading).

SUMMARY

A computer that performs a remedial action is described. This computer may include: an interface circuit that communicates with a set of communication devices in a network; a processor; and a memory that stores program instructions, where, when executed by the processor, the program instructions cause the computer to perform operations. Notably, during operation, the computer may receive, via the interface circuit, connection information associated with one or more communication devices in the set of communication devices, where the connection information specifies dynamic associations or connections between one or more electronic devices and the one or more communication devices in an environment as a function of time. Then, the computer may store, in the memory, system information, where the system information includes: first identifiers of the one or more communication devices, second identifiers of the one or more electronic devices, and timestamps, where the system information associated with a given subset of the timestamps specifies a duration of a dynamic association or connection between a given electronic device and a given communication device. Moreover, the computer may receive, via the interface circuit, occurrence information that indicates an occurrence of an event, where the event is associated with an electronic device in the one or more electronic devices or with an individual that is associated with the electronic device. In response, the computer may determine, based at least in part on the system information, one or more regions in the environment where the electronic device was present during a time interval. Next, the computer may perform the remedial action based at least in part on the determined one or more regions in the environment.

Note that a given communication device may include: an access point, an eNodeB, or a base station.

Moreover, the network may include: a wireless local area network (WLAN), a small cell, or a cellular-telephone network.

Furthermore, a given first identifier may include: a basic service set identifier (BSSID) of the given communication device, or a service set identifier (SSID) of the given communication device.

Additionally, a given second identifier may include: a media access control (MAC) address of the given electronic device, an association identifier (AID) of the given electronic device, a serial number of the given electronic device, or credentials of the individual for the network (such as a username and a password).

In some embodiments, the environment includes at least a portion of a building (such as one or more rooms).

Moreover, the event may include: potential illness of the individual, a diagnosis of disease of the individual, a security incident associated with the individual, or a change in an employment or security status of the individual.

Furthermore, the remedial action may include: providing instructions for cleaning of the one or more regions; or providing a notification or an alert. Alternatively or additionally, the remedial action may include performing contact tracing. For example, the computer may: identify a second electronic device in the one or more electronic devices that spatially and temporally overlapped with the electronic device based at least in part on the system information; and provide contact information specifying the second electronic device or a second individual associated with the second electronic device. Note that the second electronic device may be identified based at least in part on a concurrent dynamic association or connection with a same communication device as the electronic device. In some embodiments, performing the contact tracing may involve a filtering operation, such as spatial filtering, temporal filtering, or signal-strength filtering.

Moreover, the system information may include signal strengths (such as received signal strength indicators) associated with the one or more electronic devices and, at a given time, the computer may determine location information of the given electronic device based at least in part on one or more signal strengths associated with the given electronic device. For example, the computer may determine when the electronic device is within a range of the given communication device based at least in part on a signal strength associated with the electronic device that was measured by the given communication device. Alternatively or additionally, the computer may determine a location of the electronic device based at least in part on signal strengths associated with the electronic device that were measured by two or more of the communication devices.

Another embodiment provides a computer-readable storage medium with program instructions for use with the computer. When executed by the computer, the program instructions cause the computer to perform at least some of the aforementioned operations in one or more of the preceding embodiments.

Another embodiment provides a method, which may be performed by the computer. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
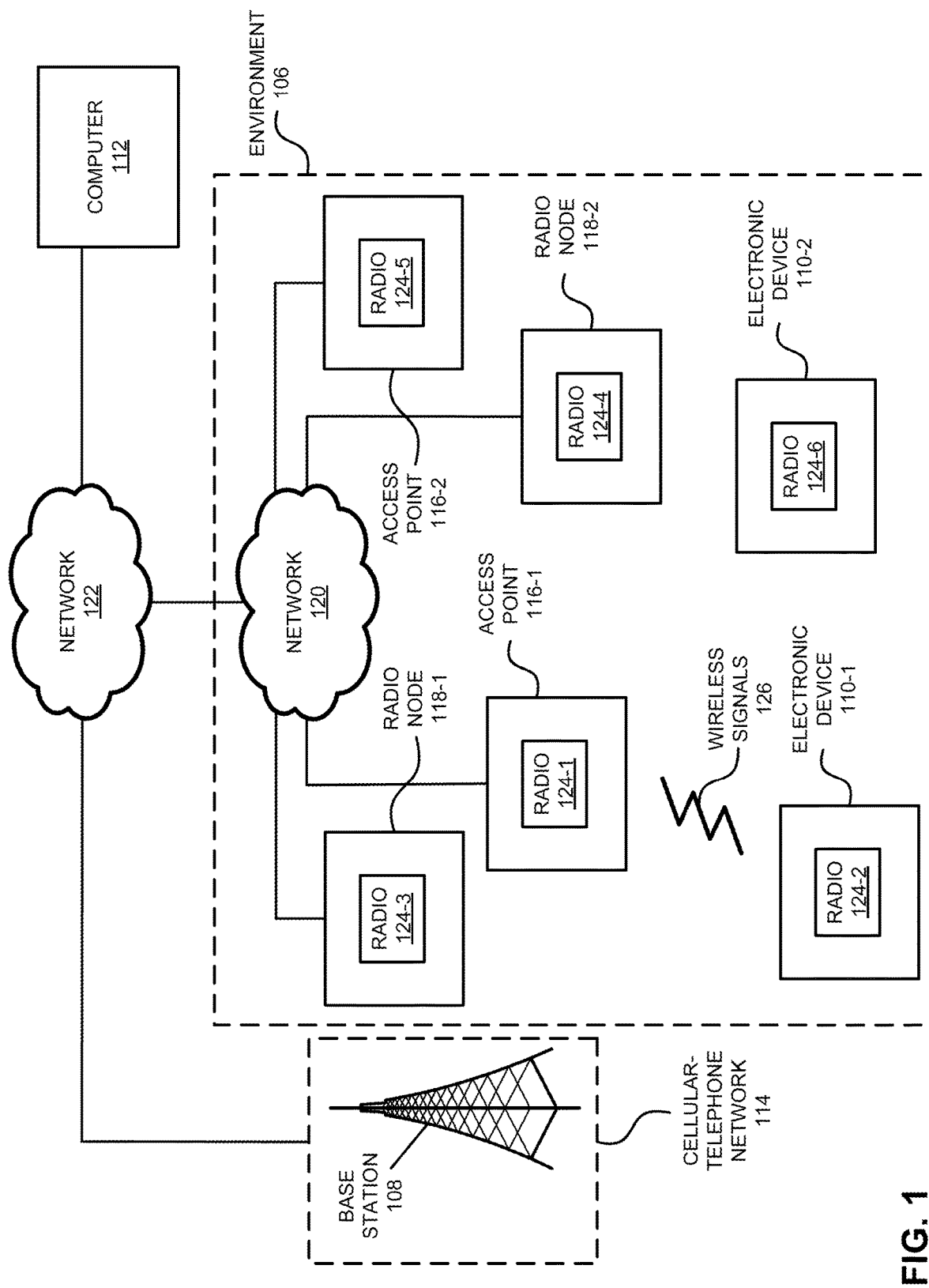
FIG. 1 is a block diagram illustrating an example of communication among electronic devices and a computer system in accordance with an embodiment of the present disclosure.

A computer that performs a remedial action is described. During operation, the computer may receive connection information associated with one or more communication devices in a network, where the connection information specifies dynamic associations or connections between one or more electronic devices and the one or more communication devices in an environment as a function of time. Then, the computer may store system information that includes: first identifiers of the one or more communication devices, second identifiers of the one or more electronic devices and timestamps, where the system information associated with a given subset of the timestamps specifies a duration of a dynamic association or connection between a given electronic device and a given communication device. Moreover, the computer may receive occurrence information that indicates an occurrence of an event, where the event is associated with an electronic device in the one or more electronic devices or with an individual that is associated with the electronic device. In response, the computer may determine, based at least in part on the system information, one or more regions in the environment where the electronic device was present during a time interval. Next, the computer may perform the remedial action based at least in part on the determined one or more regions in the environment.

By performing the remedial action, the communication techniques may facilitate an efficient and scalable technique for responding to the event. For example, when the event includes a potential illness of the individual or a diagnosis of disease of the individual, the communication techniques may allow automated contact tracing to be performed. Notably, the computer may: identify a second electronic device in the one or more electronic devices that spatially and temporally overlapped with the electronic device based at least in part on the system information; and provide contact information specifying the second electronic device or a second individual associated with the second electronic device. Note that the second electronic device may be identified based at least in part on a concurrent dynamic association or connection with a same communication device as the electronic device. Therefore, the communication techniques may allow rapid and systematic contact tracing and, more generally, responses to occurrences of the event, which may significantly expand the effectiveness of contact tracing, without requiring that instances of an application be installed on the one or more electronic devices and/or the involvement of public-health officials. Thus, the communication techniques may help address the challenges posed by an infectious disease that is easily transmitted or when an infectious disease has already infected a large number of people.

In the discussion that follows, electronic devices or components in a network communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Tex.), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). Moreover, an access point, a radio node or a base station in the network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

We now describe some embodiments of the communication techniques. FIG. 1 presents a block diagram illustrating an example of communication among electronic devices according to some embodiments. Notably, electronic devices 110 (such as cellular telephones, portable electronic devices, stations or clients, another type of electronic device, etc.) may communicate with computer 112 via a cellular-telephone network 114 (which may include a base station 108), one or more access points 116 (which may communicate using Wi-Fi) and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more networks, such as: a wireless local area network (WLAN), a small cell, and/or a cellular-telephone network.

Note that access points 116 and/or radio nodes 118 may communicate with each other and/or computer 112 (which may be a cloud-based controller that manages and/or configures access points 116 and/or radio nodes 118, or that provides cloud-based storage and/or analytical services) using a wired communication protocol (such as Ethernet) via network 120 and/or 122. Note that networks 120 and 122 may be the same or different networks. For example, networks 120 and/or 122 may an intra-net or the Internet.

Figure 2:
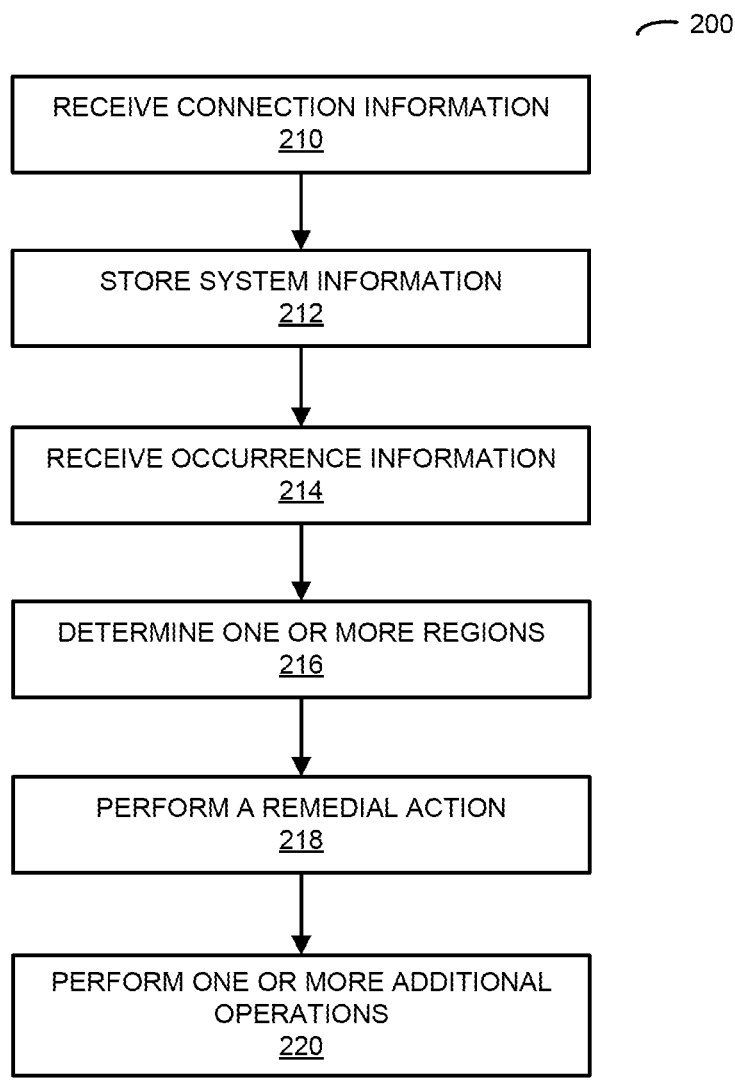
FIG. 2 is a flow diagram illustrating an example of a method for performing a remedial action using the computer in FIG. 1 in accordance with an embodiment of the present disclosure.

As described further below with reference to FIGS. 2-4, computer 112 may perform at least some of the operations in the communication techniques. Notably, as one or more individuals move around in environment 106 (such as at least a portion of one or more buildings, e.g., one or more rooms, a college or corporate campus, a plaza or square, a park, a store, a shopping mall, a factory, a manufacturing facility, an online shopping fulfillment center, a post office or a shipping center, and, more generally, an indoor and/or or outdoor area that is associated with a public space, a person, a company, a government, an organization, etc.), their associated one or more electronic devices 110 (such as electronic device 110-1) may establish dynamic associations or connections with one or more communication devices (such as one or more of access points 116, one or more of radio nodes 118 and/or one or more base stations, e.g., base station 108). For example, as an individual that uses electronic devices 110-1 moves around in environment 106, electronic device 110 may roam among base stations (such as base station 108) in cells in cellular-telephone network 114, access points 116 and/or radio nodes 118. As associations or connections are established or discontinued, one or more of the communication devices in FIG. 1 may provide, via networks 120 and/or 122, connection information to computer 112, where the connection information specifies dynamic associations or connections between one or more electronic devices 110 and the one or more communication devices in environment 106 as a function of time.

Then, computer 112 may store, e.g., in local or remote memory, system information, which may be derived or determined from the connection information. For example, the system information may include: first identifiers of the one or more communication devices (such as one or more of access points 116, one or more of radio nodes 118, etc.), second identifiers of the one or more electronic devices 110, and timestamps (such as times, dates, etc.), where the system information associated with a given subset of the timestamps specifies a duration of a dynamic association or connection between a given electronic device (such as electronic device 110-1) and a given communication device (such as access point 116-1). For example, a given first identifier may include: a BSSID of the given communication device, an SSID of the given communication device, and/or another identifier of the given communication device. Furthermore, a given second identifier may include: a MAC address of the given electronic device, an AID of the given electronic device, a serial number of the given electronic device, credentials of the individual for the network (such as a username and a password), and/or another identifier of the given electronic device or the individual. Thus, the given first identifier and/or the given second identifier may, directly or indirectly, provide unique identification information in the one or more networks.

Moreover, computer 112 may receive occurrence information that indicates an occurrence of an event, where the event is associated with an electronic device (such as electronic device 110-1) or with an individual that is associated with electronic device 110-1. For example, the event may include: potential illness of the individual (e.g., the individual may have one or more signs or symptoms of an infectious disease, such as: coughing, a fever, a change in a vital sign, etc.), a diagnosis of disease of the individual (such as an infectious disease), a security incident associated with the individual (such as theft, suspected criminal activity, unauthorized physical access, unauthorized electronic access to a computer, etc.), or a change in an employment or security status of the individual (such as termination, firing, a change in a security clearance, etc.).

In response, computer 112 may determine, based at least in part on the stored system information, one or more regions in environment 106 where electronic device 110-1 was present during a time interval (such as 1, 5, 10, 30 or 60 min., a day, etc.). For example, the one or more regions may include areas that are proximate to (such as within 10-30 ft.) one or more communication devices (such as access point 116-1) with which electronic device 110-1 has an association or a connection during a time interval, such as the preceding 12 hrs., or the preceding 1-3 days.

Next, computer 112 may perform a remedial action based at least in part on the determined one or more regions in environment 106. For example, the remedial action may include: providing instructions for cleaning of the one or more regions; or providing a notification or an alert. Note that the instruction, the notification or the alert may be presented (e.g., printed out or displayed) locally (e.g., on computer 112) and/or remotely (e.g., on another electronic device, such as in a control or security center).

Alternatively or additionally, the remedial action may include performing contact tracing. For example, computer 112 may: identify a second electronic device (such as electronic device 110-2) that spatially and temporally overlapped with electronic device 110-1 based at least in part on the system information; and provide contact information specifying electronic device 110-2 or a second individual associated with electronic device 110-2. Note that electronic device 110-2 may be identified based at least in part on a concurrent dynamic association or connection with a same communication device (such as access point 116-1) as electronic device 110-1. For example, when electronic device 110-2 has an association or a connection with access point 116-1 while electronic device 110-1 had an association or a connection with access point 116-1, electronic device 110-2 (and, thus, the second individual) may be identified.

In some embodiments, performing the contact tracing may involve a filtering operation, such as spatial filtering, temporal filtering, or signal-strength filtering. For example, a spatial filter may have a step-function shape about a given predefined or predetermined location of a given communication device, such as a circular area having a radius of 10-30 ft around the given predefined or predetermined location. In some embodiments, the physical area in environment 106 corresponding to a given spatial filter may have a symmetric or an asymmetric shape. Notably, the physical area may be determined based at least in part on a layout of environment, such as predefined or predetermined locations of walls, offices or meeting rooms in a building, etc.

Moreover, the spatial extent of the spatial filter (such as the area in which the step-function has a value of, e.g., one) may be determined using stored signal strengths of electronic device 110-1 in the system information. For example, one or more received signal strength indications (RSSIs) of or associated with communication with electronic device 110-1 may be used to determine a range between electronic device 110-1 and the given communication device (such as by using a model of pathloss in environment 106). Then, the radius of the spatial filter may be selected to be larger than the range, so that any other electronic devices (such as electronic device 110-2) that are in proximity can be identified. As an illustration, if the range is 10 ft. the radius may be between 10-30 ft. Consequently, the spatial filtering may concurrently use or may incorporate signal-strength filtering.

Furthermore, a temporal filter may have a step-function shape in time corresponding to a duration of an association or a connection between electronic device 110-1 and the given communication device. For example, the temporal filter may have a value of one during at least the duration of an association or a connection between electronic device 110-1 and the given communication device. Alternatively, to be conservative, the temporal filter may have a value of one during the duration of an association or a connection between electronic device 110-1 and the given communication device, and during time intervals immediately proceeding or following the duration (such as 1-30 min. before or after the association or the connection between electronic device 110-1 and the given communication device).

In some embodiments, the filtering operation may involve a product of a spatial filter and a temporal filter. For example, the one or more regions may be determined based at least in part on a product of a spatial filter about a given predefined or predetermined location of a given communication device, and a temporal filter in time corresponding to a duration of an association or a connection between electronic device 110-1 and the given communication device. Similarly, electronic device 110-2 (and, thus, the second individual) may be identified based at least in part on a product of a spatial filter about the given predefined or predetermined location of the given communication device, and the temporal filter corresponding to a duration (e.g., at least 1, 5, 10 or 30 min.) of a concurrent dynamic association or connection with the given communication device as electronic device 110-1.

As noted previously, the system information may include signal strengths (such as RSSIs) associated with communication one or more of electronic devices 110 and, at a given time, computer 112 may determine location information of the given electronic device based at least in part on one or more signal strengths associated with the given electronic device. For example, computer 112 may determine when electronic device 110-1 or 110-2 is within a range of the given communication device based at least in part on a signal strength associated with electronic device 110-1 or 110-2 that was measured by the given communication device. Alternatively or additionally, computer 112 may determine a location of electronic device 110-1 or 110-2 based at least in part on signal strengths associated with electronic device 110-1 or 110-2 that were measured by two or more of the communication devices. Thus, the location may be coarse (e.g., a range) or specific (such as a particular two- or three-dimensional path as a function of time of a given electronic device in environment 106). In some embodiments, the location is determined using triangulation, trilateration, an association or a connection with a given cell or a given communication device, and/or additional information (such as information from a local positioning system and/or a Global Positioning System). Depending of the technique(s) used and whether the location in indoors or outdoors), note that the accuracy or granularity of the determined location may be between 1-30 ft.

In this way, the communication techniques may allow computer 112 to efficiently, systematically and rapidly respond to the event. Moreover, the communication techniques may allow existing communication infrastructure to be used, thereby eliminating the need for instances of an application to be installed on electronic devices 110. Furthermore, the communication techniques may be readily scaled to a large-scale environment 106 with a large number of electronic devices 110, which would be extremely difficult (if not impossible) using existing contact tracing techniques. Consequently, the communication techniques may provide a cost-effective way to protect a population (such as employees of a company) from an outbreak of an infectious disease. This capability may allow an organization or a company to safely continue operations during such an outbreak.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, access points 116 and/or radio nodes 118 and electronic devices 110 may wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

Figure 5:
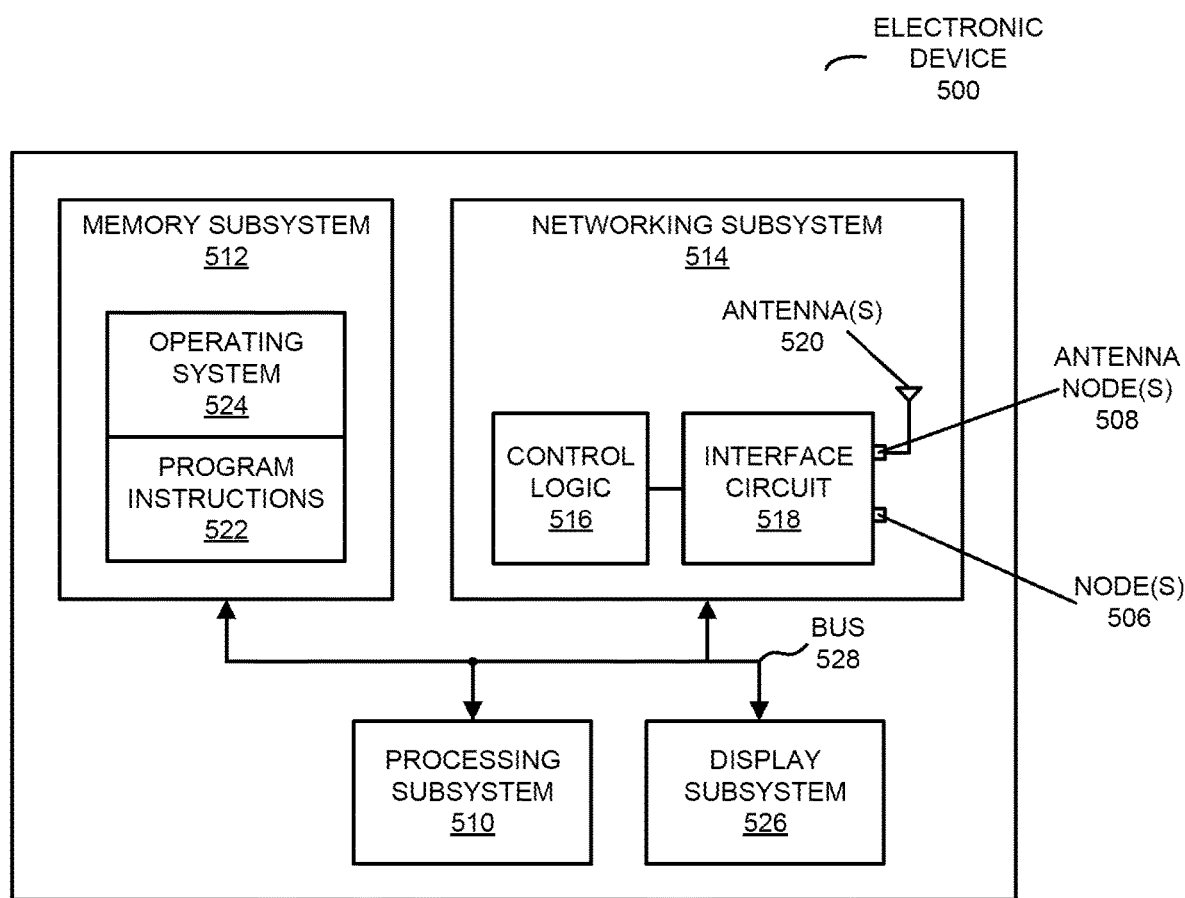
FIG. 5 is a block diagram illustrating an example of an electronic device in accordance with an embodiment of the present disclosure.

As described further below with reference to FIG. 5, electronic devices 110, computer 112, access points 116 and radio nodes 118 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 126 (represented by a jagged line) are transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While note shown in FIG. 1, in some embodiments there may be one or more routers or switches.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Moreover, computer 112 may be implemented at a single computer or multiple computers in a computer system. Furthermore, computer 112 may be implemented at a single location or at multiple, different locations. Additionally, a given one of the one or more access points 116 may be a physical access point or a virtual or 'software' access point that is implemented on a computer or an electronic device.

We now describe embodiments of the method. FIG. 2 presents a flow diagram illustrating an example of a method 200 for performing a remedial action, which may be performed by a computer or a computer system, e.g., computer 112 in FIG. 1. During operation, the computer may receive connection information (operation 210) associated with one or more communication devices in the set of communication devices, where the connection information specifies dynamic associations or connections between one or more electronic devices and the one or more communication devices in an environment as a function of time.

Then, the computer may store system information (operation 212), where the system information includes: first identifiers of the one or more communication devices, second identifiers of the one or more electronic devices, and timestamps, where the system information associated with a given subset of the timestamps specifies a duration of a dynamic association or connection between a given electronic device and a given communication device.

Moreover, the computer may receive occurrence information (operation 214) that indicates an occurrence of an event, where the event is associated with an electronic device in the one or more electronic devices or with an individual that is associated with the electronic device. For example, the event may include: potential illness of the individual, a diagnosis of disease of the individual, a security incident associated with the individual, and/or a change in an employment or security status of the individual.

In response, the computer may determine, based at least in part on the system information, one or more regions (operation 216) in the environment where the electronic device was present during a time interval. Next, the computer may perform the remedial action (operation 218) based at least in part on the determined one or more regions in the environment. For example, the remedial action may include: providing instructions for cleaning of the one or more regions; or providing a notification or an alert. Alternatively or additionally, the remedial action may include performing contact tracing.

In some embodiments, the computer may optionally perform one or more additional operations (operation 220). For example, during the contact tracing, the computer may: identify a second electronic device in the one or more electronic devices that spatially and temporally overlapped with the electronic device based at least in part on the system information; and provide contact information specifying the second electronic device or a second individual associated with the second electronic device. Note that the second electronic device may be identified based at least in part on a concurrent dynamic association or connection with a same communication device as the electronic device. In some embodiments, performing the contact tracing may involve a filtering operation, such as spatial filtering, temporal filtering, or signal-strength filtering.

Moreover, the system information may include signal strengths (such as received signal strength indicators) associated with the one or more electronic devices and, at a given time, the computer may determine location information of the given electronic device based at least in part on one or more signal strengths associated with the given electronic device. For example, the computer may determine when the electronic device is within a range of the given communication device based at least in part on a signal strength associated with the electronic device that was measured by the given communication device. Alternatively or additionally, the computer may determine a location of the electronic device based at least in part on signal strengths associated with the electronic device that were measured by two or more of the communication devices.

Note that a given communication device may include: an access point, an eNodeB, or a base station. Moreover, the network may include: a WLAN, a small cell, and/or a cellular-telephone network. Furthermore, a given first identifier may include: a BSSID of the given communication device, and/or an SSID of the given communication device. Additionally, a given second identifier may include: a MAC address of the given electronic device, an AID of the given electronic device, a serial number of the given electronic device, and/or credentials of the individual for the network (such as a username and a password). In some embodiments, the environment includes at least a portion of a building (such as one or more rooms).

In some embodiments of method 200, there may be additional or fewer operations. Furthermore, the order of the operations may be changed, and/or two or more operations may be combined into a single operation. For example, while method 200 illustrated the determining of the one or more regions based at least in part on the occurrence of an event that is associated with an electronic device in the one or more electronic devices or with an individual that is associated with the electronic device, in other embodiments the calculation may be reversed. Notably, in response to the occurrence of an event (such as theft or criminal activity) in one or more regions, the electronic device or the individual that is associated with the electronic device may be identified based at least in part on the system information.

Figure 3:
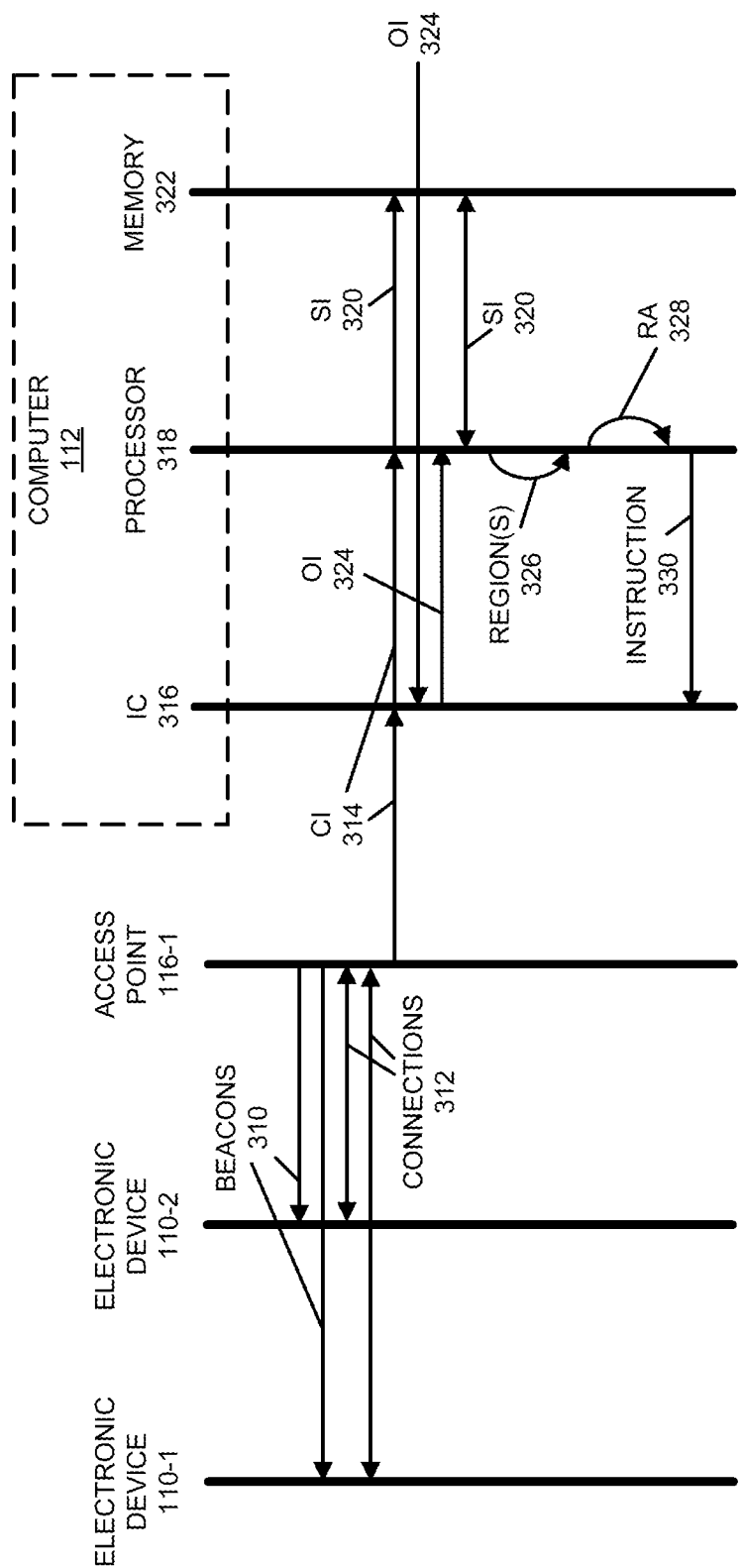
FIG. 3 is a drawing illustrating an example of communication among the electronic devices in FIG. 1 in accordance with an embodiment of the present disclosure.
Figure 4:
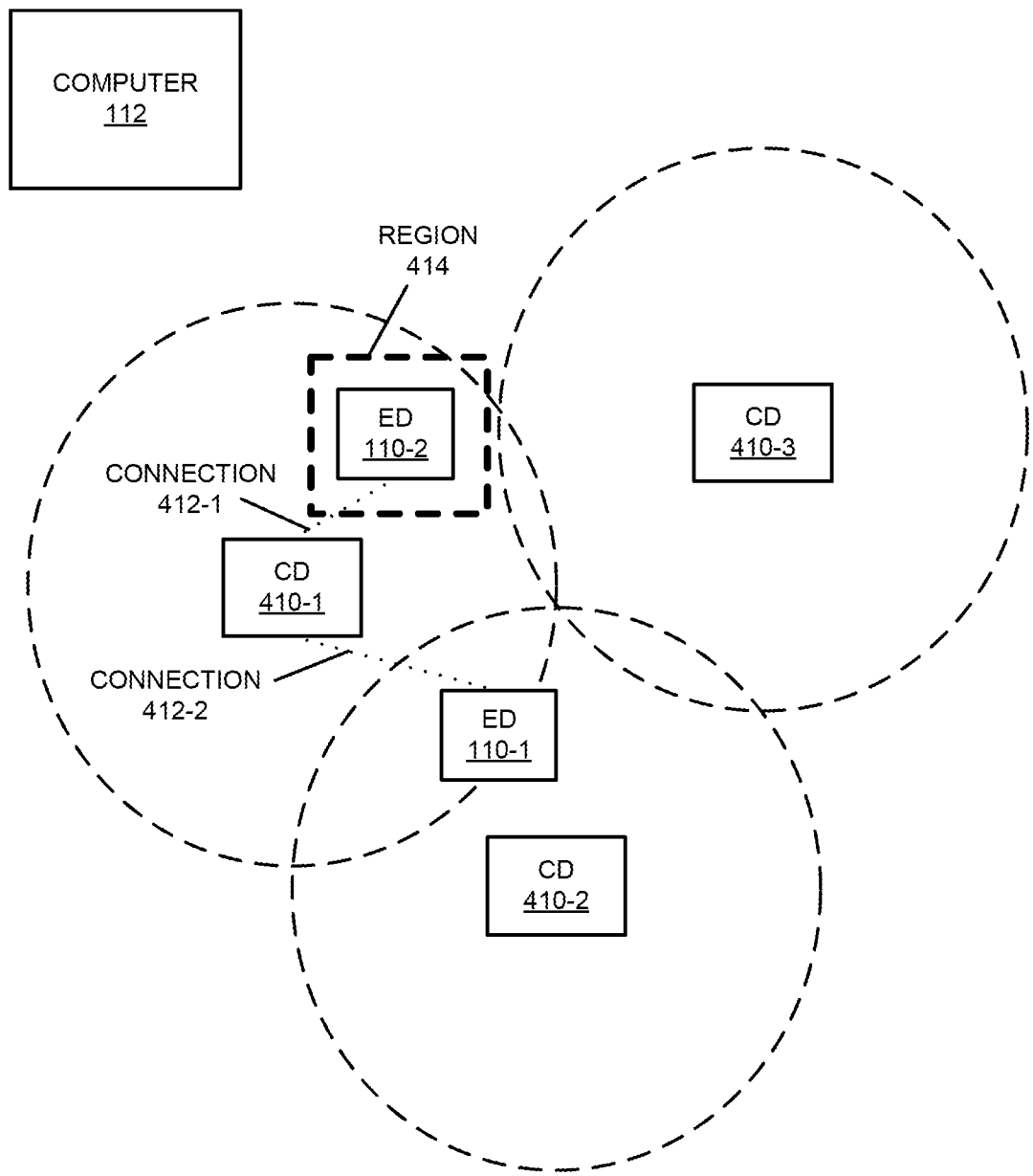
FIG. 4 is a drawing illustrating an example of a technique for performing a remedial action in accordance with an embodiment of the present disclosure.

Embodiments of the communication techniques are further illustrated in FIG. 3, which presents a drawing illustrating an example of communication among electronic device 110-1, electronic device 110-2, access point 116-1, and computer 112. In FIG. 3, electronic devices 110 may discover access point 116-1 (e.g., by receiving beacons 310 provided by an interface circuit in access point 116-1, or by sending probe requests to access point 116-1 and receive probe responses from access point 116-1). Then, electronic devices 110 may establish associations or connections 312 with access point 116-1 by communicating with the interface circuit in access point 116-1.

Then, access point 116-1 may provide connection information (CI) 314 to computer 112. This connection information may specify dynamic associations or connections 312 between electronic devices 110 and, e.g., access point 116-1 in an environment as a function of time. For example, connection information 314 may include: an identifier of access point 116-1, identifiers of electronic devices 110, timestamps, optional RSSI values of or associated with communication with electronic devices 110, etc.

After receiving connection information 314, an interface circuit 316 in computer 112 may provide connection information 314 to a processor 318 in computer 112. Processor 318 may store system information (SI) 320 (which is based at least in part on connection information 316) in memory 322 in or associated with computer 112. Note that system information 320 may include: the identifier of access point 116-1, the identifiers of electronic devices 110, the timestamps, optional RSSI values of electronic devices 110, etc. Moreover, system information 320 associated with a given subset of the timestamps may specify a duration of a dynamic association or connection between a given electronic device (such as electronic device 110-1) and access point 116-1.

Moreover, interface circuit 316 may receive occurrence information (O1) 324 (e.g., via a user interface of computer 112, or from another computer or another electronic device). This occurrence information may indicate an occurrence of an event, where the event is associated with electronic device 110-1 or with an individual that is associated with electronic device 110-1. In response, interface circuit 318 may provide occurrence information 324 to processor 318.

Furthermore, in response to receiving occurrence information 324, processor 318 may access at least a portion of system information 320 in memory 322 (such as the portion of system information 320 that is associated with electronic device 110-1). Then, processor 318 may determine, based at least in part on at least the portion of the system information 320, one or more regions 326 in the environment where electronic device 110-1 was present during a time interval (such as a preceding 0-3 days).

Next, processor 318 may perform a remedial action (RA) 328 based at least in part on the determined one or more regions 326 in the environment. For example, processor 328 may provide an instruction 330 interface circuit 316 to provide: instructions for cleaning of the one or more regions 326, a notification or an alert (such as on a display, or to another computer or another electronic device). Alternatively or additionally, remedial action 328 may include performing contact tracing, e.g., identifying electronic device 110-2 based at least on part on the concurrent associations or connections 312 with access point 116-1.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

In some embodiments of the communication techniques, stored system information is used to determine one or more potentially affected regions and/or to perform contact tracing. This is shown in FIG. 4, which presents a drawing illustrating an example of a technique for performing a remedial action. As individuals move around in the environment, their electronic devices (EDs) 110 may establish dynamic associations or connections 412 with communication devices 410 that are within wireless communication range (as illustrated by the dashed circles in FIG. 4). These communication devices may provide connection information that specifies these dynamic associations or connections to computer 112.

In response, computer 112 may store system information with information about one or more of electronic devices 110, one or more of communication devices 410, timestamps of associations or connections 412 being established or discontinued, optional RSSI values, etc. Note that the system information associated with a subset of the timestamps may a duration of a dynamic association or connection between a given electronic device and a given communication device.

Moreover, computer 112 may receive occurrence information that indicates an occurrence of an event, where the event is associated with electronic device 110-1 or with an individual that is associated with electronic device 110-1. In response, computer 112 may determine, based at least in part on the system information, one or more regions (such as region 414, which is illustrated by the dashed square in FIG. 4) in the environment where electronic device 110-1 was present during a time interval. The one or more regions may indicate a path of electronic device 110-1 through the environment.

Next, computer 112 may perform the remedial action based at least in part on the determined one or more regions in the environment. For example, the remedial action may include performing contact tracing, such as identifying electronic device 110-2 or a second individual associated with electronic device 110-2 based at least in part on spatial and/or temporal overlap of associations or connections 412 of electronic devices 110-1 and 110-2 with communication devices 410.

In some embodiments, the communication techniques are used to perform contact tracing. Contact tracing is often used to mitigate the spread of a contagious or infectious disease.

By leveraging communication-device infrastructure in, e.g., enterprise environments, contact tracing may be facilitated. For example, offices typically have a network of access points deployed for Wi-Fi/cellular connectivity. Moreover, employees typically have their cellular telephones with them and these cellular telephones connect to the communication devices when they enter an office. Furthermore, as the employees move around the office, their cellular telephones roam from one communication device to another. In the communication techniques, identifiers of electronic devices connecting to communication devices along with the duration of connections are stored in system information. Then, if there is a need to subsequently trace the contacts for a particular person, the stored system information can be used to determine the communication devices (and, thus, the regions or locations) where the electronic device of the person was connected at a particular time or over a particular time interval. Furthermore, the spatial and temporal overlap of connections with other electronic devices of other persons with the connections of the electronic device can be used to identify the other electronic devices and/or the other persons. In this way, e.g., individuals in adjacent cubicles can be identified. Alternatively or additionally, all individuals who were within 20 $ft^2$ of an affected individual can be identified.

Note that the communication techniques may leverage RSSI values to refine the determined regions or locations of the electronic device and, thus, the spatial and/or temporal overlap with the other electronic devices. For example, the time-averaged RSSI may be stored in the system information. Moreover, the RSSI may be determined whenever a given electronic device communicates with a given communication device, such as when the given electronic device provides a keep-alive message to maintain an association or a connection, or when the given electronic device provides an acknowledgment (such as in response to a periodic management frame with a timing synchronization function).

Furthermore, in some embodiments, a communication device may track or monitor a location of a given electronic device using one or more additional techniques. For example, the location may be monitored using a tag, such as a Bluetooth tag. Alternatively or additionally, the communication device may track or monitor the movements of an individual associated with the given electronic device (e.g., using images acquired using an image sensor and an image-processing technique to identify and follow the individual in the images). This latter approach may be useful if the individual does not keep their electronic device on their person at all times, such as if they briefly leave their electronic device in the cubicle or office.

Additionally, in some embodiments, the determined one or more regions and/or the spatial and/or temporal overlap with the other electronic device(s) may be refined by including measurements and/or modeling of airflow in the environment. For example, modeling of the airflow may be based at least in part on settings of a heating or air conditioning system, the locations of vents in the environment, and a predefined or predetermined layout or geometry of an office (such as the positions of walls). The ability to account for the impact of airflow may allow other electronic device(s) and, thus, other individual(s) to be identified even when the other electronic device(s) do not have concurrent associations or connections with the same communication device(s) as the electronic device. Notably, the other electronic device(s) and, thus, other individual(s) may be identified based at least in part on their spatial and temporal presence in an airflow plume from the determined one or more regions (such as when the other electronic device(s) and, thus, other individual(s) are 'downwind' from the determined one or more regions).

We now describe embodiments of an electronic device, which may perform at least some of the operations in the communication techniques. FIG. 5 presents a block diagram illustrating an example of an electronic device 500 in accordance with some embodiments, such as one of: base station 108, one of electronic devices 110, one of access points 116, one of radio nodes 118 or computer 112. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program instructions 522 or operating system 524), which may be executed by processing subsystem 510. Note that the one or more computer programs, program modules or instructions may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a metal pad or a connector, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s)

to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as directors or reflectors) and/or one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments instructions 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514 and/or of electronic device 500. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 522, operating system 524 (such as a driver for interface circuit 518) or in firmware in interface circuit 518. Alternatively or additionally, at least some of the operations in the communication techniques may be implemented in a physical layer, such as hardware in interface circuit 518.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
   an interface circuit configured to communicate with a set of communication devices in a network;
   a processor; and
   memory configured to store program instructions, wherein, when executed by the processor, the program instructions cause the computer to perform operations comprising:
   receiving, at the interface circuit, connection information associated with one or more communication devices in the set of communication devices, wherein the connection information specifies dynamic associations or connections between one or more electronic devices and the one or more communication devices in an environment as a function of time;
   storing, in the memory, system information, wherein the system information comprises: first identifiers of the one or more communication devices, second identifiers of the one or more electronic devices, and timestamps, wherein the system information associated with a given subset of the timestamps specifies a duration of a given dynamic association or connection in the dynamic associations or connections between a given electronic device and a given communication device of the one or more electronic devices and the one or more communication devices;
   receiving, at the interface circuit, occurrence information that indicates an occurrence of an event, wherein the event is associated with a first electronic device in the one or more electronic devices or with an individual that is associated with the first electronic device;
   determining, based at least in part on the system information and the occurrence information, one or more regions in the environment where the first electronic device was present during a time interval; and
   performing a remedial action based at least in part on the determined one or more regions in the environment.

2. The computer of claim 1, wherein a given communication device comprises: an access point, an eNodeB, or a base station.

3. The computer of claim 1, wherein the network comprises: a wireless local area network (WLAN), a small cell, or a cellular-telephone network.

4. The computer of claim 1, wherein a given first identifier comprises: a basic service set identifier (BSSID) of the given communication device, or a service set identifier (SSID) of the given communication device.

5. The computer of claim 1, wherein a given second identifier comprises: a media access control (MAC) address of the given electronic device, an association identifier (AID) of the given electronic device, a serial number of the given electronic device, or credentials of the individual for the network.

6. The computer of claim 1, wherein the environment comprises at least a portion of a building.

7. The computer of claim 1, wherein the event comprises: potential illness of the individual, a diagnosis of disease of the individual, a security incident associated with the individual, or an employment or security status of the individual.

8. The computer of claim 1, wherein the remedial action comprises: providing instructions for cleaning of the one or more regions; or providing a notification or an alert.

9. The computer of claim 1, wherein the remedial action comprises performing contact tracing.

10. The computer of claim 9, wherein performing the contact tracing comprises:

identifying a second electronic device in the one or more electronic devices that spatially and temporally overlapped with the first electronic device based at least in part on the system information; and providing contact information specifying the second electronic device or a second individual associated with the second electronic device.

11. The computer of claim 10, wherein the second electronic device is identified based at least in part on a concurrent dynamic association or connection with a same communication device as the electronic device.

12. The computer of claim 10, wherein performing the contact tracing comprises a filtering operation.

13. The computer of claim 12, wherein the filtering operation comprises: spatial filtering, temporal filtering, or signal-strength filtering.

14. The computer of claim 1, wherein the system information comprises signal strengths associated with the one or more electronic devices; and wherein, at a given time, the operations comprise determining location information of the given electronic device based at least in part on one or more signal strengths associated with the given electronic device.

15. The computer of claim 14, wherein the operations comprise determining when the first electronic device is within a range of the given communication device based at least in part on a signal strength associated with the first electronic device that was measured by the given communication device.

16. The computer of claim 14, wherein the operations comprise calculating a location of the first electronic device based at least in part on signal strengths associated with the first electronic device that were measured by two or more of the communication devices.

17. A non-transitory computer-readable storage medium for use in conjunction with a computer, the non-transitory computer-readable storage medium storing program instructions that, when executed by the computer, cause the computer to perform operations comprising:

receiving connection information associated with one or more communication devices in the set of communication devices, wherein the connection information specifies dynamic associations or connections between one or more electronic devices and the one or more communication devices in an environment as a function of time;

storing system information, wherein the system information comprises: first identifiers of the one or more communication devices, second identifiers of the one or more electronic devices, and timestamps, wherein the system information associated with a given subset of the timestamps specifies a duration of a given dynamic association or connection in the dynamic associations or connections between a given electronic device and a given communication device of the one or more electronic devices and the one or more communication devices;

receiving occurrence information that indicates an occurrence of an event, wherein the event is associated with a first electronic device in the one or more electronic devices or with an individual that is associated with the electronic device;

determining, based at least in part on the system information and the occurrence information, one or more regions in the environment where the first electronic device was present during a time interval; and performing a remedial action based at least in part on the determined one or more regions in the environment.

18. The non-transitory computer-readable storage medium of claim 17, wherein the operations comprises:

identifying a second electronic device in the one or more electronic devices that spatially and temporally overlapped with the first electronic device based at least in part on the system information; and providing contact information specifying the second electronic device or a second individual associated with the second electronic device.

19. A method for performing a remedial action, comprising:

by a computer:

receiving connection information associated with one or more communication devices in the set of communication devices, wherein the connection information specifies dynamic associations or connections between one or more electronic devices and the one or more communication devices in an environment as a function of time;

storing system information, wherein the system information comprises: first identifiers of the one or more communication devices, second identifiers of the one or more electronic devices, and timestamps, wherein the system information associated with a given subset of the timestamps specifies a given dynamic association or connection in the dynamic associations or connections between a given electronic device and a given communication device of the one or more electronic devices and the one or more communication devices;

receiving occurrence information that indicates an occurrence of an event, wherein the event is associated with a first electronic device in the one or more electronic devices or with an individual that is associated with the electronic device;

determining, based at least in part on the system information and the occurrence information, one or more regions in the environment where the first electronic device was present during a time interval; and performing the remedial action based at least in part on the determined one or more regions in the environment.

20. The method of claim 19, wherein the method comprises:

identifying a second electronic device in the one or more electronic devices that spatially and temporally overlapped with the first electronic device based at least in part on the system information; and providing contact information specifying the second electronic device or a second individual associated with the second electronic device.

* * * * *